June 24, 1924.

S. O. WHITE

TRANSMISSION

Filed July 18, 1923

INVENTOR
Samuel O. White,
BY
Arthur M. Hood.
ATTORNEY

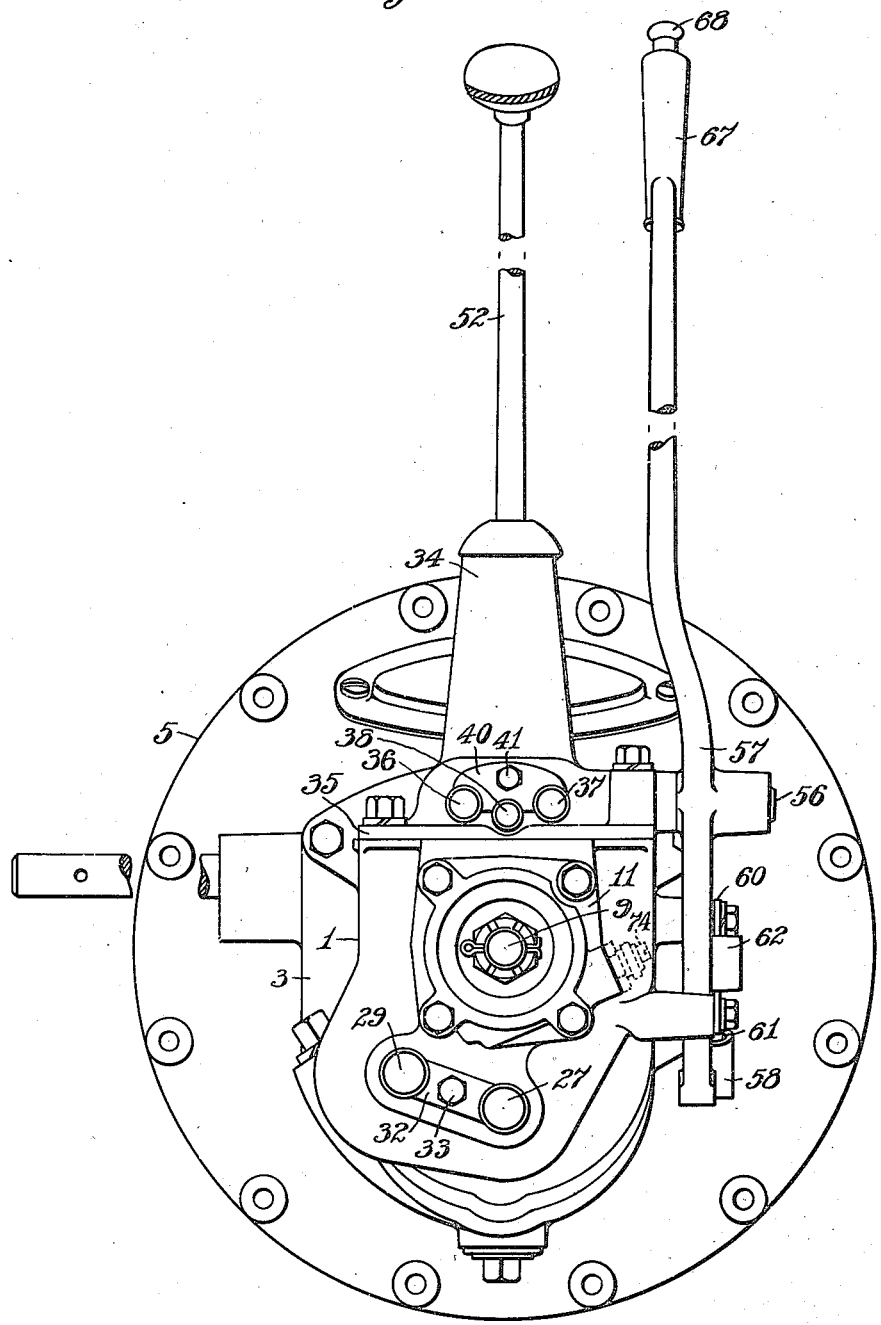

June 24, 1924.
S. O. WHITE
1,499,043
TRANSMISSION
Filed July 18, 1923   3 Sheets-Sheet 3
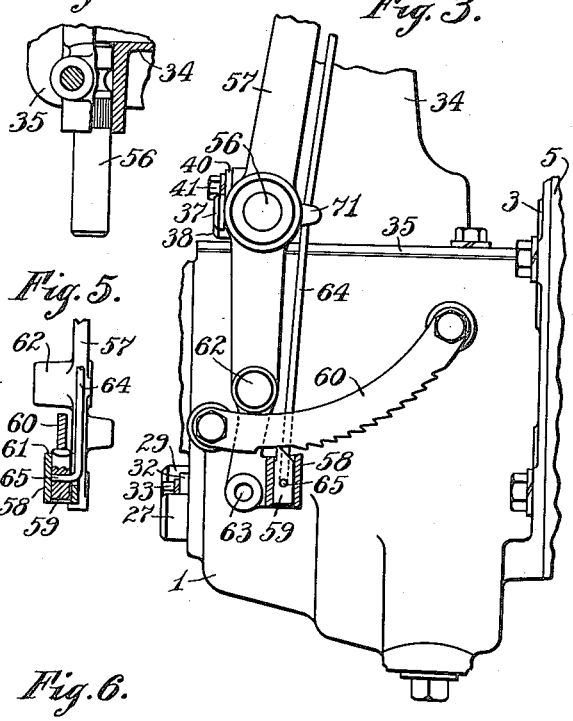
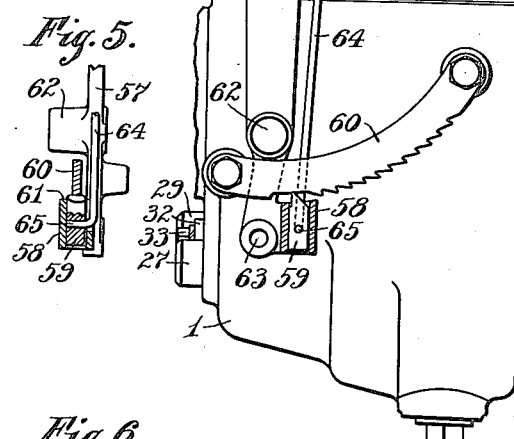
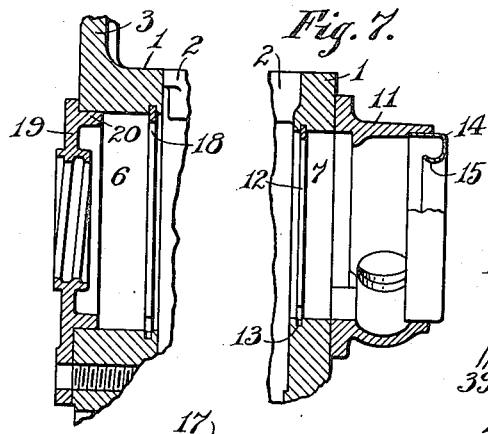
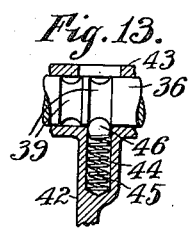
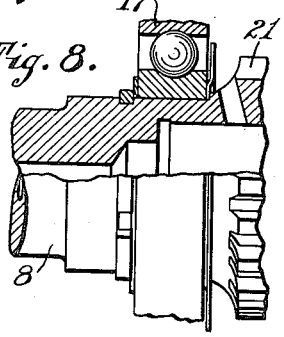
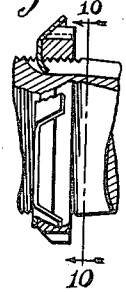
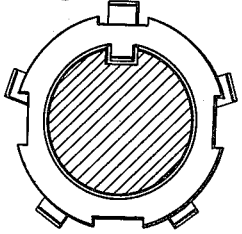
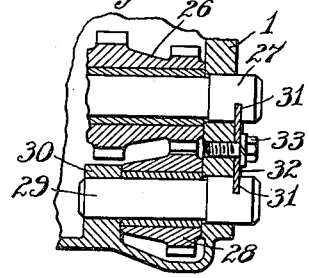
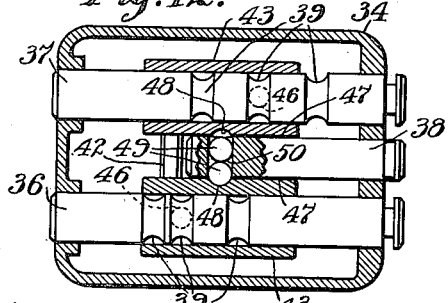
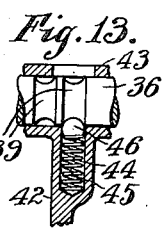
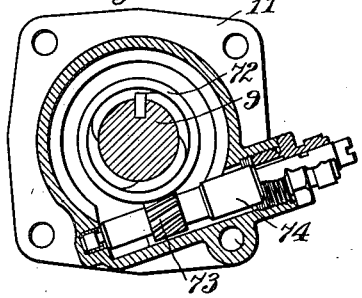
INVENTOR
*Samuel O. White,*
BY
*Arthur M. Hood.*
ATTORNEY Patented June 24, 1924.

1,499,043

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

TRANSMISSION.

Application filed July 18, 1923. Serial No. 652,268.

*To all whom it may concern:*

Be it known that I, SAMUEL O. WHITE, a citizen of the United States, residing at Muncie, in the county of Delaware and State of Indiana, have invented a new and useful Transmission, of which the following is a specification.

My invention relates to improvements in transmissions for automobiles and the like and it is one of the objects of my invention to provide a transmission gearing which may be manufactured at a minimum cost and which is so arranged that the parts may be readily assembled and disassembled.

For the purpose of disclosing my invention I have illustrated one embodiment thereof in the accompanying drawing in which, Fig. 1 is a longitudinal section of a transmission embodying my invention;

Fig. 2 is a rear end view thereof;

Fig. 3 is a detail side elevation showing particularly the brake operating handle mounting;

Fig. 4 is a detail section of the stud mounting for the brake handle;

Fig. 5 is a detail section of the brake dog;

Fig. 6 is a detail section of the bearing receiving opening for the clutch shaft;

Fig. 7 is a detail section of the bearing receiving opening for the transmission shaft;

Fig. 8 is a detail section of the ball bearing mounting at the front end of the housing;

Fig. 9 is a detail section showing the speedometer worm drive lock nut;

Fig. 10 is a transverse section on the line 10—10 of Fig. 9;

Fig. 11 is a detail section of the means for locking the counter and idler shafts in position in the transmission casing;

Fig. 12 is a detail section showing the mounting for the shifting forks;

Fig. 13 is a detail section of the shifting fork positioning means, and

Fig. 14 is a detail section of the speedometer drive.

Figure 1:
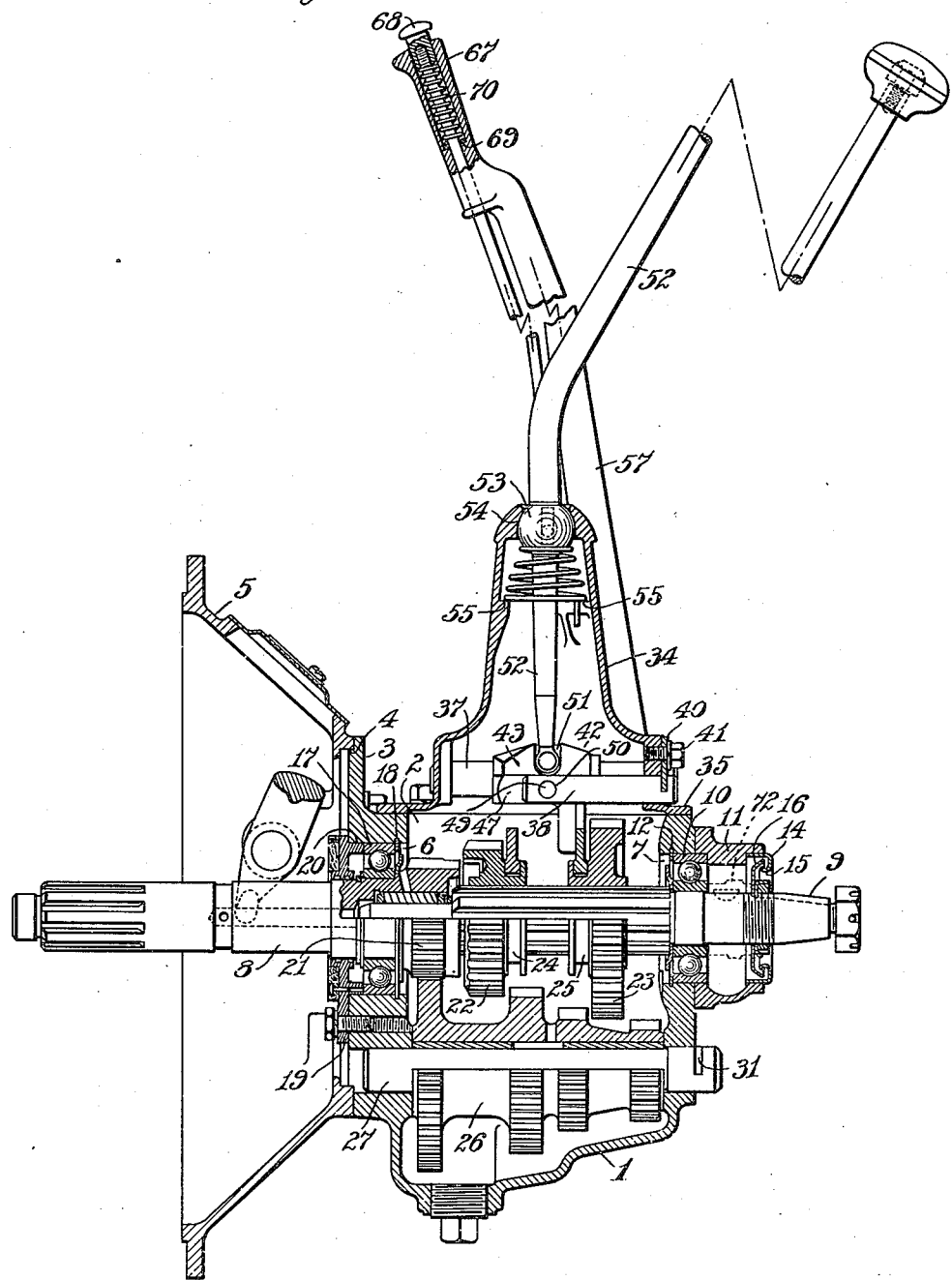

In the embodiment of the invention illustrated, I provide a transmission case 1 which is preferably substantially rectangular in shape and provided with a top opening 2. This case at its front end is provided with a flange 3 which, on its front face is provided with an annular shoulder 4 adapted to fit in the opening at the rear end of a separable clutch housing 5, the two parts being secured together by suitable screws which pass through the flange 3 and into the wall of the clutch housing. By this arrangement, while the clutch housing and transmission case are securely connected together for mounting purposes and the like, at the same time the transmission case may be removed as an entity independently of the clutch housing.

The two end walls of the transmission case are provided with aligned openings 6 and 7 to receive the bearings. The main driving shaft which, as is usual in transmissions of this character, is formed of two sections, the front section 8 being adapted to be connected with the clutch and the rear section 9 being adapted to be connected with the transmission shaft. The rear opening 7 is adapted to receive a ball bearing cage 10 which fits snugly within the opening and has its front end abutting against a shoulder, the rear end being adapted to project slightly beyond the plane of the wall of the opening and fit within a shouldered opening in a retainer plate 11. The abutting shoulder at the front of the cage is formed by a split snap ring 12 which is adapted to seat in an annular groove 13 formed in the side wall of the opening. This provides a cheap and efficient abutment shoulder for the ball bearing cage, as in manufacture the two aligned openings for the main drive shaft may be bored straight through by a single tool, after which the annular groove 13 may be grouted out and the snap ring shoulder 12 placed in position, thus avoiding a number of operations which would be necessary if it were attempted to form a shoulder integrally with the wall of the opening. At the rear end of the opening, in the retaining plate 11, there is mounted an oil return cap 14 which preferably has an interned grooved portion 15 to catch the oil from an oil fling ring 16 mounted on the shaft section 9.

The forward opening is likewise adapted to receive a ball bearing cage 17 which fits within the opening and has its rear end abutting against a snap ring shoulder 18, similar in construction and arrangement to the snap ring 12. The bearing is held in place by a retaining plate 19 having an annular shoulder 20 fitting within the opening and contacting with the front of the ball bearing cage 17 and held in position by suitable screws passing through the plate and into the wall of the gear casing. The front section of the main drive shaft is provided with the usual main drive gear 21 and the rear section has slidably keyed thereon, the usual sliding gears 22 and 23 provided with collars 24 and 25 adapted to be engaged by the shifting forks hereinafter described. These gears are arranged to mesh with the countershaft gears 26 mounted on a countershaft 27 secured at the bottom of the transmission casing and one of these gears is adapted to be moved into mesh with an idler 28 mounted on an idler shaft 29 likewise mounted in the lower portion of the transmission casing. For mounting the countershaft 27 the front and rear walls of the casing are bored straight through to form openings for the reception of this shaft. The idler shaft is a shorter shaft and as a mounting for this shaft the rear wall is bored straight through and on the interior of the casing there is provided a shoulder 30 having an opening formed therein in alignment with the opening in the rear wall of the casing for the idler shaft 29. The two shafts 27 and 29, at their outer ends, are provided with slots 31 and are inserted in position in their respective openings, being held against rotation and rigidly in position by means of a key plate 32 fitting in the slots 31 and secured to the rear wall of the casing by means of a screw 33.

The top opening 2 in the transmission casing is covered by a shift frame 34, the lower portion of which is preferably rectangular in shape and provided with a flange 35 by which it may be bolted to the top of the transmission casing. This shift frame is extended upwardly into a portion having substantially a frusto conical shape. The lower portion of the frame is adapted to receive the two shift rails 36 and 37 and the interlock rail 38. The two shift rails are provided with annular grooves 39 for positioning the shifter forks which operate thereon and in mounting these two rails in position the front and rear walls of the shifter frame are bored with aligned openings, into which the front and rear ends of the rails fit. The interlock rail is shorter than the two shifter rails and only extends into the shifter frame about half way, it being mounted in an opening in the rear wall of the frame between the openings for the shifter rails. For securing the three rails in position against rotation and withdrawal, the ends of the shift rails which project beyond the rear wall, are provided with annular grooves and the end of the interlock rail is provided with a transverse groove, the three grooves being adapted to have fitted into them a key plate 40 which is fastened to the rear wall of the frame by means of a suitable screw 41. Each of the shifter rails has slidably mounted thereon, a shifter fork 42. These two forks are duplicates except that one fork is mounted in a reverse position on the rails so that the fork proper will be spaced apart from the other and each fork comprises the fork proper which extends downwardly and is arranged to fit in one of the collars 24 or 25 of the sliding gears and a hub 43 sliding on the shifter rail. The fork 42 has an enlargement on one side which is provided with a socket 44 for receiving a coil spring 45 and a ball 46 urged by the spring into engagement with the positioning grooves on the shifter rails. Each of the hubs is also provided with a semi-circular groove 47 which is adapted to receive a portion of the interlock rail 38 and with a notch 48 into which is adapted to be forced an inter-lock pin or ball 49 mounted in a transverse opening 50 formed in the inter-lock rail 38. The hub 43 is also provided with a shifter lever receiving notch 51 into which is adapted to engage the end of the shift lever 52. This lever, intermediate of its ends, is provided with a ball 53 adapted to be held in a socket 54 surrounding the opening extending through the top of the shift lever extension and a coil spring interposed between the ball and a shoulder 55 on the interior of the extension maintains the shift lever in its supported operating position with the ball seating in the socket and the top of the lever projecting through the opening in the top of the shifter frame.

The shifter frame also has secured to one side of it, a brake lever stud 56 on which is pivotally mounted the emergency brake lever 57. This lever, at its lower end, is provided with a socket 58 adapted to receive a dog 59 arranged to engage the teeth on a brake sector 60 secured on the side of the transmission casing 1 and spaced apart therefrom to permit the lower end of the brake lever to be interposed between the sector 60 and the side of the casing. The socket 58 is formed in an offset 61 at the lower end of the lever so that the dog will be brought directly under the sector and a second offset or lug 62 is provided on the lever above the sector so that the sector will be between a pair of offset members on the brake lever. The lower end of the brake lever is provided with an eye 63 for connecting the same with the emergency brake rod. The dog is urged into engaging position by means of an operating rod 64, the lower end of which is provided with a lug 65 engaging in an opening in the dog, the wall of the socket 58 being slotted to accommodate the lug. The upper end of this rod passes through a hollow handle 67 of the lever and has secured at its upper end a thumb button 68 between which and a shoulder 69 in the handle is interposed a coil spring 70 which urges the rod in a direction to urge the dog into engaging position. At the point where the rod passes the hub of the lever it is held in position between a pair of guide lugs 71 which prevent lateral movement of the rod and thereby prevent the lug 65 from becoming detached from the dog 59.

The speedometer drive is taken from the drive shaft 9 and to this end there is mounted on the drive shaft a worm gear 72 which meshes with a worm pinion 73 mounted on the shaft 74 journaled in bearings in the casing. The outer end of this shaft is provided with means for connecting thereto, the speedometer shaft.

I claim:

1. The combination with a transmission casing and transmission gears therein, of means for shifting the gears, supporting rods for said shifting means supported in aligned openings in the opposite ends of the casing and having transverse slots formed in the ends thereof and exteriorly of the casing, and a locking plate secured to the casing and fitting in said slots.

2. The combination with a transmission casing and transmission gears therein, of means for shifting the gears, supporting rods for said shifting means supported in aligned openings in the opposite ends of the casing and having positioning grooves for positioning the shifting means, the ends of said rods being adapted to project beyond the casing and having transverse grooves formed therein, a locking plate secured on the exterior of the casing and adapted to engage in said grooves for positioning the rods in the casing and locking the same against withdrawal.

3. The combination with a transmission casing and transmission gears therein, of means for shifting the gears, supporting rods for said shifting means supported in aligned openings in the opposite ends of the casing, an interlock rail interposed between said supporting rods, said supporting rods and interlock rail having their ends projecting beyond the side of the casing and provided with transverse grooves, and a locking plate secured to the casing and engaging said grooves to lock the rods in position.

4. The combination with a transmission casing and transmission gears therein, of means for shifting the gears, supporting rods for said shifting means supported in aligned openings in the opposite ends of the casing and having transverse slots formed in the ends thereof, and a locking plate secured to the side wall of the casing and engaging said slots to prevent the longitudinal displacement of the rods.

5. The combination with a transmission casing and transmission gears therein, of means for shifting the gears, supporting rods for said shifting means supported in aligned openings in the opposite ends of the casing, a locking rail supported in an opening in the casing, said rail and rods having transverse slots therein adjacent one of the side walls of the casing, a locking plate secured to the side wall of the casing and engaging in said slots to lock the rods and rail against longitudinal displacement.

6. The combination with a transmission casing and transmission gears therein, of shifter forks for said gears mounted within said casing, supporting rods for said shifter forks having positioning grooves thereon, a locking rail interposed between said supporting rods and having extending transversely thereto a shiftable interlock member, said shifter forks being replicas of one another but reversely mounted on the rods and each comprising a hub and a shifter fork mounted near one end of the hub, a spring pressed ball receiving socket in the hub for receiving a ball arranged to engage the positioning grooves on the supporting rods, said hub having at a center point intermediate of its ends an interlock receiving slot and a shifter lever receiving slot.

7. The combination with a transmission casing and transmission gears therein, of shifter forks for said gears, a pair of supporting rods for said forks and an interlock rail interposed between said rods cylindrical in cross section, said forks comprising a hub arranged to be slidably mounted on the rods and having a substantially semi-circular recess arranged to slidably engage the interlock rail.

8. The combination with a transmission casing and transmission gears therein, of supporting shafts for certain of said gears mounted in aligned openings and having at their ends adjacent one wall of the casing transversely extending slots and a locking plate secured to the wall of the casing and engaging in said slots to lock said shafts against longitudinal and rotative movement.

In witness whereof, I, SAMUEL O. WHITE, have hereunto set my hand at Muncie, Indiana, this 12th day of July, A. D., one thousand nine hundred and twenty-three.

SAMUEL O. WHITE.